United States Patent
Hosini

(10) Patent No.: US 9,160,226 B2
(45) Date of Patent: Oct. 13, 2015

(54) CONVERTER CELL AND ASSOCIATED CONVERTER ARM AND METHOD FOR PREVENTING UNDESIRED OVERCHARGING OF ENERGY STORAGE DEVICE OF THE CONVERTER CELL

(75) Inventor: Falah Hosini, Västerås (SE)

(73) Assignee: ABB TECHNOLOGY AG, Zürich (CH)

(*) Notice: Subject to any disclaimer, the term of this patent is extended or adjusted under 35 U.S.C. 154(b) by 0 days.

(21) Appl. No.: 14/357,382

(22) PCT Filed: Nov. 11, 2011

(86) PCT No.: PCT/EP2011/069960
§ 371 (c)(1),
(2), (4) Date: Jul. 31, 2014

(87) PCT Pub. No.: WO2013/068048
PCT Pub. Date: May 16, 2013

(65) Prior Publication Data
US 2014/0369094 A1  Dec. 18, 2014

(51) Int. Cl.
*H02M 7/483* (2007.01)
*H02M 1/32* (2007.01)
*H02M 7/49* (2007.01)
*H02M 1/38* (2007.01)

(52) U.S. Cl.
CPC *H02M 1/32* (2013.01); *H02M 7/49* (2013.01); *H02M 1/38* (2013.01); *H02M 7/483* (2013.01); *H02M 2007/4835* (2013.01)

(58) Field of Classification Search
USPC ............. 363/56.02, 56.03, 56.04, 56.05, 132, 363/56.06, 56.07, 56.08; 361/67, 88, 90, 361/91.01, 93.1
See application file for complete search history.

(56) References Cited

U.S. PATENT DOCUMENTS

| | | | | |
|---|---|---|---|---|
| 3,703,680 | A * | 11/1972 | Frank et al. | 323/210 |
| 5,633,793 | A * | 5/1997 | Lee et al. | 363/127 |
| 5,654,884 | A * | 8/1997 | Mohan | 363/126 |
| 5,793,586 | A | 8/1998 | Rockot et al. | |
| 7,064,458 | B2 * | 6/2006 | Wittner | 307/65 |
| 8,711,586 | B2 * | 4/2014 | Yamada et al. | 363/41 |
| 2005/0083716 | A1 * | 4/2005 | Marquardt | 363/132 |

(Continued)

FOREIGN PATENT DOCUMENTS

| | | |
|---|---|---|
| DE | 101 03 031 A1 | 7/2002 |
| EP | 2 282 399 A1 | 2/2011 |
| GB | 2 221 794 A | 2/1990 |
| WO | WO 2010/069399 A1 | 6/2010 |

OTHER PUBLICATIONS

Neudörfer, Alfred. "Konstruieren sicherheitsgerechter Produkte," Apr. 15, 2011, Springer-Verlag, Berlin, pp. 192-193.

*Primary Examiner* — Jue Zhang
*Assistant Examiner* — Lakaisha Jackson
(74) *Attorney, Agent, or Firm* — Birch, Stewart, Kolasch & Birch, LLP

(57) ABSTRACT

It is presented a converter cell comprising: a first terminal and a second terminal; an energy storage device connected on a first end to the second terminal; a first switch connected on a first end to the first terminal; a second switch arranged between the two terminals; and a third switch connected between a second end of the first switch and a second end of the energy storage device. A corresponding converter arm and method are also presented.

19 Claims, 5 Drawing Sheets

(56) References Cited

U.S. PATENT DOCUMENTS

| | | |
|---|---|---|
| 2009/0296433 A1 | 12/2009 | Sihler et al. |
| 2011/0013441 A1 | 1/2011 | Gruber et al. |
| 2013/0170255 A1* | 7/2013 | Mukherjee et al. ............. 363/35 |
| 2014/0112038 A1* | 4/2014 | Hasler et al. ............... 363/56.05 |

* cited by examiner

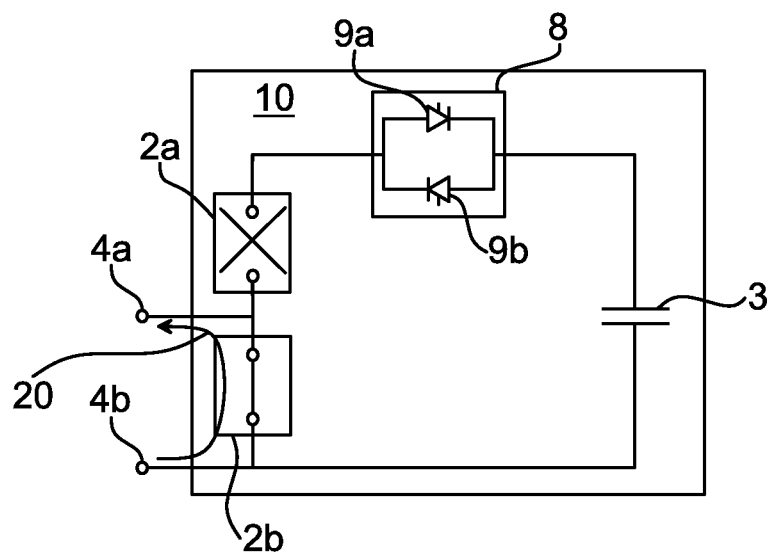
Fig. 4
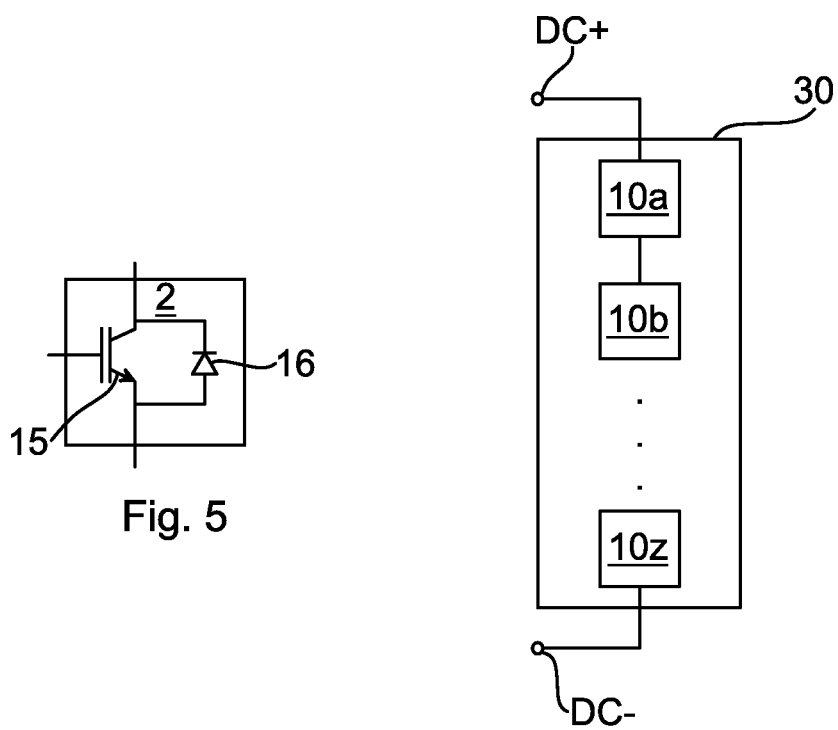
Fig. 5
Fig. 6

US 9,160,226 B2

CONVERTER CELL AND ASSOCIATED CONVERTER ARM AND METHOD FOR PREVENTING UNDESIRED OVERCHARGING OF ENERGY STORAGE DEVICE OF THE CONVERTER CELL

TECHNICAL FIELD

The invention relates to a converter cell and associated method with improved failure handling.

BACKGROUND

Converter cells are used in a variety of electrical applications. For example, converter cells can be used for power conversion in either direction between DC (Direct Current) and AC (Alternating Current), or DC to DC.

By using converter cells connected serially, an increased voltage rating can be achieved, e.g. to use the converter cells in high voltage applications such as for HVDC (High Voltage DC) applications. Additionally, converter cells can be connected in parallel to increase current rating.

Failure handling in converter cells is important but can also be complicated and/or expensive. There is a need to improve failure handling of converter cells.

SUMMARY

According to a first aspect, it is presented a converter cell comprising: a first terminal and a second terminal; an energy storage device connected on a first end to the second terminal; a first switch connected on a first end to the first terminal; a second switch arranged between the two terminals; and a third switch connected between a second end of the first switch and a second end of the energy storage device.

Using the third switch, energy transfer to and from the energy storage device can be controlled regardless of the states of the first and second switches. This provides excellent failure handling capability compared to the prior art. In particular, this can protect the energy storage device in a better way, which may reduce rating requirements of the energy storage device, reducing component cost. Since such converter cells often are provided in large numbers, this can result in significant cost savings.

The converter cell may be arranged to open the third switch when the first switch has failed, such as into an open circuit or a short circuit. Also, the third switch can be arranged to open when control of the first switch has failed. This can prevent undesired overcharging of the energy storage device.

The converter cell may be arranged to open the third switch when the second switch has failed into an open circuit or a short circuit.

The converter cell may be arranged to open the third switch to prevent charging of the energy storage device.

The third switch may comprise two antiparallel thyristors, or the third switch may comprise a bidirectional thyristor. Thyristors can be controlled with great accuracy and thyristors rated for high voltage are typically less expensive than energy storing device such as capacitors.

The third switch may comprise a thyristor in parallel with a mechanical switch. Using a mechanical switch, this reduces any power losses through the third switch when it is closed in a normal operating mode, i.e. when no failure has occurred in the converter cell.

The converter cell may be arranged to control energisation of the energy storage device by controlling a phase angle of the thyristor allowing a current to energise the energy storage device. This allows for a soft charging of the energy storage devices which reduces or even eliminates the need for any additional components for soft charging of the energy storage device.

The first and second switches may each comprise a semiconductor device and an antiparallel diode and the semiconductor device may be an insulated gate bipolar transistor, IGBT. Alternatively, the semiconductor device can be an Integrated Gate-Commutated Thyristors (IGCTs), a Gate Turn-Off thyristor (GTOs), or any other suitable high power semiconductor component The energy storage device may be a capacitor. Alternatively, the energy storage device can be super capacitor, an inductor, a battery, etc.

A second aspect is a converter arm comprising a plurality of converter cells according to the first aspect. The converter cell can for example be used in power conversion applications such as AC/DC conversion of DC/DC conversion.

A third aspect is a method for controlling a converter cell comprising a first terminal and a second terminal; an energy storage device connected on a first end to the second terminal; a first switch connected on a first end to the first terminal; a second switch arranged between the two terminals; and a third switch connected between a second end of the first switch and a second end of the energy storage device. The method comprises the step of when the first switch fails, opening the third switch.

The method may further comprise the step of: controlling the third switch to limit power transfer to the energy storage device.

The method may further comprise the step of: when the second switch has failed into a short circuit or into an open circuit, opening the third switch.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 4 is a schematic diagram illustrating an embodiment of the converter cell of FIG. 2A where the first switch has failed into an open circuit;

FIG. 5 is a schematic diagram illustrating an embodiment of the first and second switches of FIGS. 2A-B and 3A-B;

FIG. 6 is a schematic diagram illustrating a converter arm comprising a plurality of converter cells according to FIGS. 2A-B;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
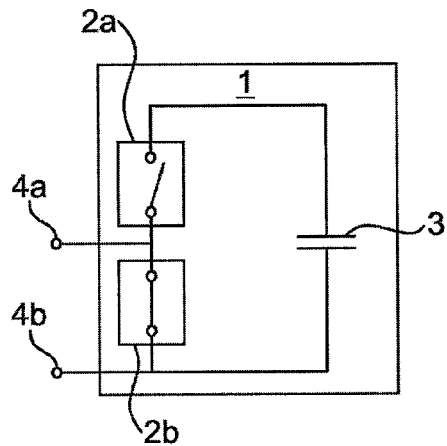
FIG. 1 is a schematic diagram illustrating a conventional converter cell.

FIG. 1 is a schematic diagram illustrating a conventional converter cell 1. The converter cell 1 has two terminals being a first terminal 4a and a second terminal 4b. Moreover, the converter cell 1 comprises a first switch 2a, a second switch 2b and an energy storage device 3, here in the form of a capacitor. In a first operating mode, the first switch 2a is closed, i.e. is in a conducting state, and the second switch is open, i.e. is in a disconnected state. In this situation, the energy storage device is essentially connected between the first terminal 4a and the second terminal 4b. Depending on the load current direction this can lead to the energy storage device charging or discharging. In a second operating mode, the first switch 2a is open and the second switch is closed. This is a bypass mode, essentially bypassing the converter cell 1.

Figure 2A:
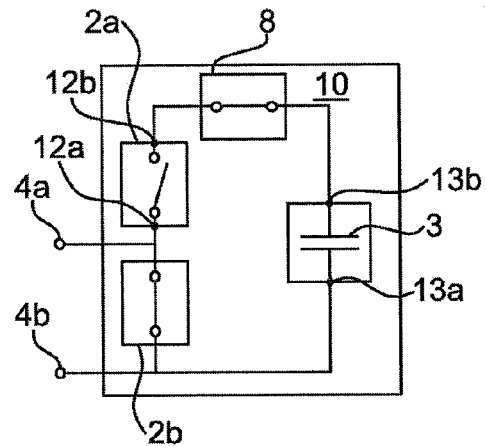
FIG. 2A is a schematic diagram illustrating a converter cell according to a first embodiment.

FIG. 2A is a schematic diagram illustrating a converter cell 10 according to a first embodiment. Here a third switch 8 is provided between the first switch 2a and the energy storage device. The energy storage device can be a capacitor, super capacitor, inductor, battery, etc.

Figure 2B:
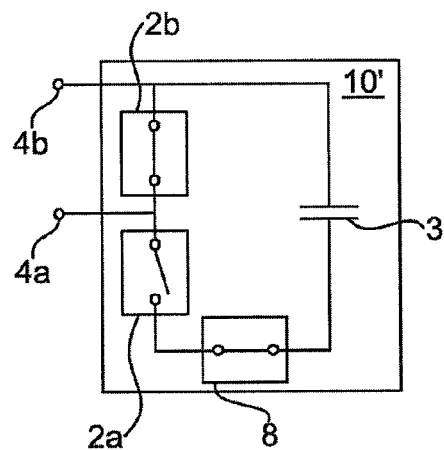
FIG. 2B is a schematic diagram illustrating a converter cell according to a second embodiment.

FIG. 2B is a schematic diagram illustrating a converter cell 10' according to a second embodiment. The structure is a mirror image of the embodiment of FIG. 2A.

Figure 3A:
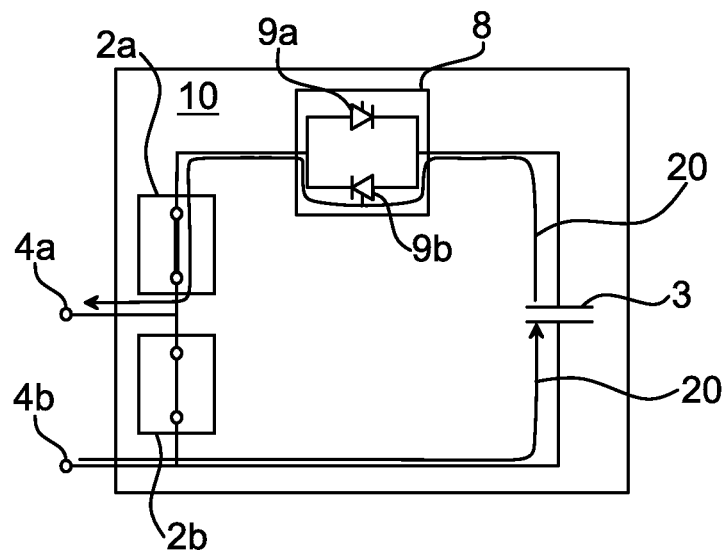
FIGS. 3A-B are schematic diagrams illustrating an embodiment of the converter cell of FIG. 2A where the first switch has failed into a short circuit.
Figure 8:
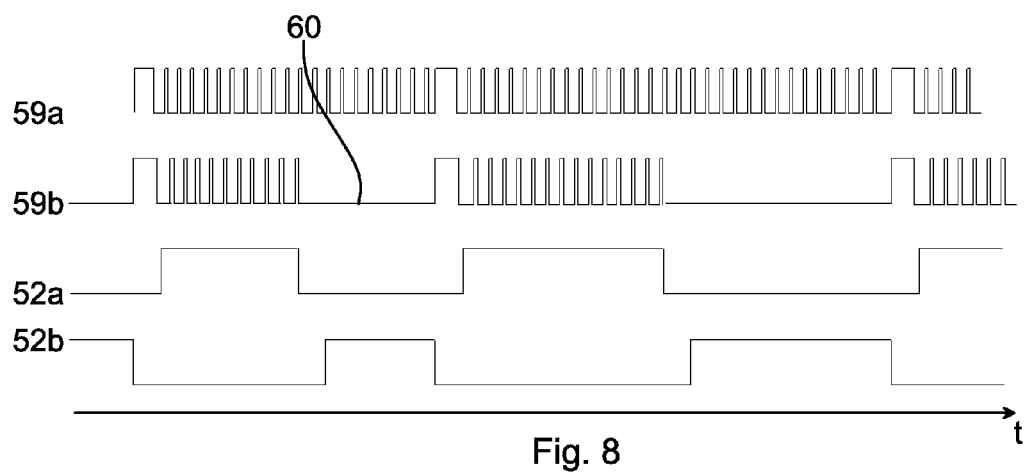
FIG. 8 is a schematic graph illustrating control of the third switch of FIGS. 2A-B along with control signals to the first switch and the second switch.

FIG. 3A is a schematic diagram illustrating a situation when the first switch has failed into a short circuit. In this example, the energy storage device 3 discharges its energy. The third switch 8 is illustrated to comprise two antiparallel thyristors 9a-b. Alternatively, the third switch 8 can comprise a bidirectional thyristor or two antiparallel semiconductor switching elements, such as insulated gate bipolar transistors (IGBTs), Integrated Gate-Commutated Thyristors (IGCTs), a Gate Turn-Off thyristor (GTOs), or any other suitable high power semiconductor component. A first thyristor 9a can be made to conduct towards the energy storage device 3 using trigger pulses as illustrated in FIG. 8. Conversely, a second thyristor 9b can be made to conduct from the energy storage device using its own set of trigger pulses. In this example, it is safe to let the second thyristor 9b conduct to let the energy storage device 3 discharge.

Figure 3B:
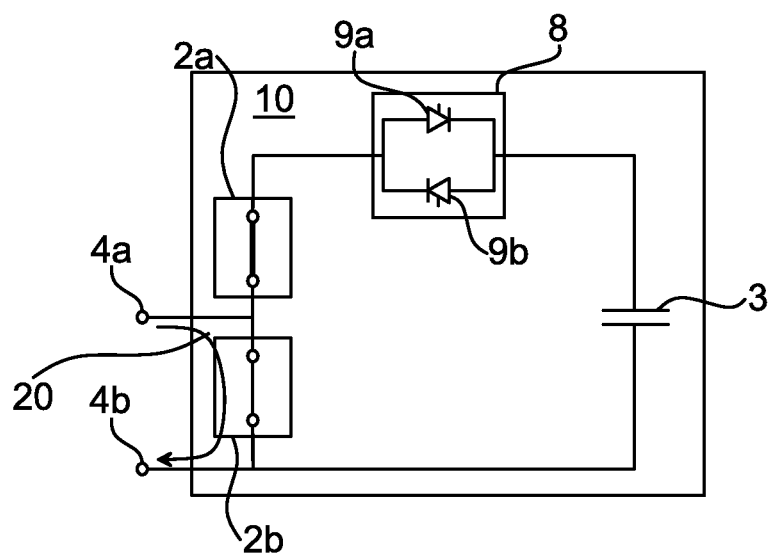

FIG. 3B is a schematic diagram illustrating a situation when the first switch has failed into a short circuit. In this situation, the first thyristor 9a is opened, preventing the energy storage device 3 from being charged and overcharged. The second switch 2b is closed whereby a bypass of the converter cell is effected. In this way, the energy storage device 3 is protected from uncontrolled charging which can damage the component.

FIG. 4 is a schematic diagram illustrating a situation when the first switch 2a has failed into an open circuit. In this situation, the second thyristor 9a is opened, preventing the energy storage device 3 from being charged and overcharged, since a current can still pass through the first switch 2a if there is an antiparallel diode. The second switch 2b is closed whereby a bypass of the converter cell is effected. In this way, the energy storage device 3 is protected from uncontrolled charging which can damage the component.

FIG. 5 is a schematic diagram illustrating a switch 2 an embodiment of the first and second switches 2a-b of FIGS. 2A-B and 3A-B. The switch 2 comprises a switching element 15 and a diode 16 provided antiparallel to the switching element 15. The switching element 15 can be an insulated gate bipolar transistor (IGBT), Integrated Gate-Commutated Thyristor (IGCT), a Gate Turn-Off thyristor (GTO), or any other suitable high power semiconductor component.

FIG. 6 is a schematic diagram illustrating a converter arm 30 comprising a plurality of converter cells according to any one of FIGS. 2A-B, 3A-B and 4. The converter cells 10a-z are connected serially between DC+ and DC−. The number of cells can be selected according to requirements and can be any number including one, two, three or more.

Here now follows a description of the various fault conditions and how these are handled using the structure shown in FIG. 3A. When a failure occurs in the first switch 2a or the second switch 2b, an immediate action can be to block the second thyristor 9b and turn off the first and second switches 2a-b of the cell. The first thyristor 9a will be kept on until a full diagnostic of the failure is performed. The next step in the fault handling operation depends on the type of failure as outlined below:

Case 1: First Switch 2a Goes into Short Circuit

If the load current direction is out of the first terminal 4a, the energy storage device 3 continues to discharge via the second thyristor 9b and the shorted first switch 2a. No further action is (or can be) taken until the current changes direction. During this period the energy storage device 3 might become completely discharged. In this case an antiparallel diode in the second switch 2b can take over the load current.

When the load current changes direction and starts charging the energy storage device 3, the first thyristor 9a is blocked and the second switch 2b is softly turned on to commutate the load current and turn off the first thyristor 9a. The second switch 2b is then kept on continuously to provide a permanent bypass of the cell.

If the load current direction is into the first terminal 4a, the energy storage device 3 continues to charge via the first thyristor 9a and first switch 2a. As soon as this fault condition is verified, the first thyristor 9a is blocked and the second switch 2b is softly turned on to commutate the load current and turn off the first thyristor 9a. The second switch 2b is then kept on continuously to provide a permanent bypass of the cell.

Case 2: The Second Switch 2b Goes into Short Circuit

Regardless of the load current direction, this fault case leads to bypassing of the cell. As soon as this failure is identified, the first thyristor 9a is also blocked to prevent unintentional overcharging of the energy storage device.

Hence, during chip transitions of the second switch 2b, the thyristor pair ensures that the energy storage device 3 is not charged and with a higher rating of the thyristors 9a-b compared to the energy storage device 3, there is sufficient voltage to effect a transition to a new short circuited chip.

Case 3: The First Switch 2a Turns Off Permanently

This can for example happen if a gate unit controlling the first switch 2a fails.

If the load current direction is out of the first terminal 4*a*, the load current automatically commutates to any antiparallel diode in the second switch 2*b*. As soon as this fault condition is verified, the first thyristor 9*a* is blocked and the second switch 2*b* is softly turned on and kept on continuously to provide a permanent bypass of the cell.

If the load current direction is into the first terminal 4*a*, the energy storage device 3 continues to charge via the first thyristor 9*a* and any antiparallel diode of the first switch 2*a*. As soon as this fault condition is verified, the first thyristor 9*a* is blocked and the second switch 2*b* is softly turned on to commutate the load current and turn off the first thyristor 9*a*. The second switch 2*b* is then kept on continuously to provide a permanent bypass of the cell.

Case 4: Second Switch 2*b* Turns Off Permanently (e.g. GU Failure)

This can for example happen if a gate unit controlling the second switch 2*b* fails.

As soon as this fault condition is verified, the first thyristor 9*a* is also blocked. This will eventually result in a forced short circuit failure condition of the second switch 2*b*. During chip transitions of the second switch 2*b*, the thyristor pair ensures that the energy storage device 3 is not charged and due to the higher rating of the thyristors 9*a*-*b*, there is sufficient voltage to effect a transition to a new short circuited chip.

The first thyristor 9*a* can additionally be utilized to smoothly energise the system without high inrush current by using phase angle control during energisation. This eliminates a need for inrush current resistors and additional equipment.

The embodiments presented above provide a simple cell design without series connection of IGBTs and reduces requirements on controlling gate units. The solution also facilitates modularity for any range of power and voltage.

Figure 7:
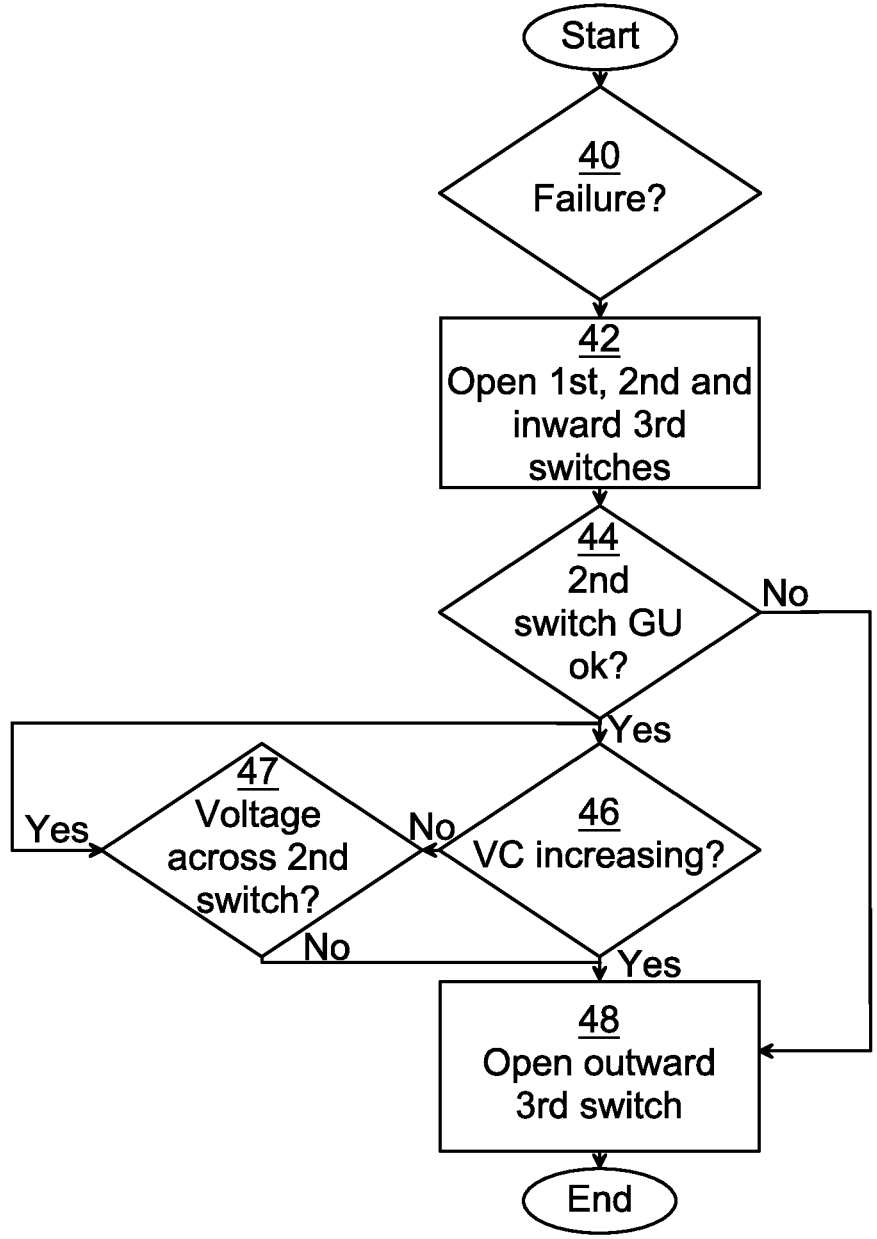
FIG. 7 is a flow chart illustrating the operation of the converter cell according to any one of FIGS. 2A-B.

FIG. 7 is a flow chart illustrating the operation of the converter cell according to any one of FIGS. 2A-B.

In an initial conditional failure step 40, it is determined whether a failure has occurred. The failure can be a short circuit, an open circuit or a control failure such that a failure of a gate unit for either of the first switch and/or the second switch. If a failure has occurred, the process continues to an open $1^{st}$, $2^{nd}$ and inward $3^{rd}$ switches step 42. Otherwise the method ends.

In the open $1^{st}$, $2^{nd}$ and inward $3^{rd}$ switches step 42, the first and second switches as well as the inward third switch (e.g. the first thyristor 9*a*) are all opened.

In a conditional $2^{nd}$ switch GU ok step, it is determined whether the gate unit of the second switch is ok. If this is the case, the process continues to a conditional VC increasing step 46. Otherwise, the process continues to an open outward third switch step 48.

In the conditional VC increasing step 46, it is determined whether VC, indicating the voltage over the energy storage device 3 is increasing. If this is the case, the process continues to the open outward third switch step 48. Otherwise, the process continues to a conditional voltage across $2^{nd}$ switch step 47.

In the conditional voltage across $2^{nd}$ switch step 47, it is determined whether there is a voltage across the second switch. If this is the case, the process returns to the conditional VC increasing step 46. Otherwise, the process continues to the open outward $3^{rd}$ switch step 48.

In the open outward $3^{rd}$ switch step 48, the outward part of the third switch, e.g. the second thyristor 9*b*, is opened.

FIG. 8 is a schematic graph illustrating control over time of the third switch of FIGS. 2A-B along with control signals to the first switch and the second switch in a normal operating mode, i.e. when no failure occurs. The graph contains for signal patterns 59*a*-*b*, 52-*b*. The uppermost first signal pattern 59*a* represents the thyristor trigger signals for the first thyristor 9*a*. The next, second signal pattern 59*b* represents the thyristor trigger signals for the second thyristor 9*b*. The third signal pattern 52*a* represents control signals for the first switch 2*a* and the lowermost, fourth signal pattern 52*b* represents control signals for the second switch 2*b*.

As can be seen, the thyristors are provided with trigger signals repeatedly, since each time the current changes, a new trigger signal is required to make them conduct. Optionally, the second thyristor can be kept off at a period 60 when the signal 52*a* for the first switch is low, i.e. when the first switch is open. During this time, there is no reason to make the second thyristor conduct.

In the case the third switch comprises a thyristor 9*a* in parallel with a mechanical switch, the procedure is different. In this case, the mechanical switch is kept closed continuously during normal operation and the first thyristor 9*a* is kept off. During failures, the first thyristor 9*a* can be triggered to control current when the switch opens.

Figure 9A:
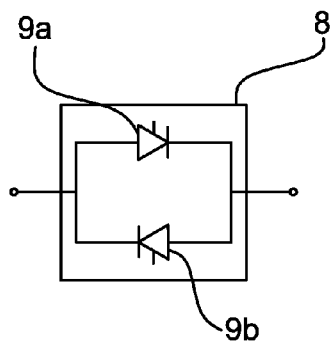
FIG. 9A is schematic diagram illustrating a first embodiment of the third switch of FIGS. 2A-B, 3A-B, 4.
Figure 9B:
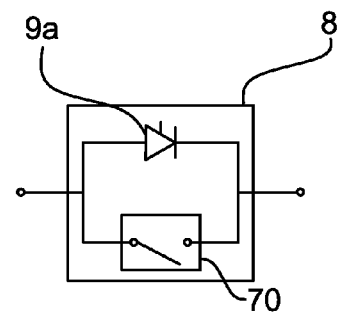
FIG. 9B is schematic diagram illustrating a second embodiment of the third switch of FIGS. 2A-B.

FIG. 9A is schematic diagram illustrating a first embodiment of the third switch of FIGS. 2A-B, 3A-B, 4. The third switch 8 here comprises two antiparallel thyristors 9*a*-*b* and function as explained above with reference to FIGS. 3A-B FIG. 9B is schematic diagram illustrating a second embodiment of the third switch of FIGS. 2A-B. Here, the third switch 8 comprises a mechanical switch 70 and an optional first thyristor 9*a*. As will be explained below, the first thyristor can be used to prevent arcs from occurring when the mechanical switch 70 opens. The mechanical switch 70 can be any suitable controllable mechanical switch, e.g. using coils to magnetically control the state of the switch. The mechanical switch 70 can be bi-stable, to prevent inadvertent switching between states. An advantage of using a mechanical switch is reduced power losses in normal operation compared to when thyristors are used. Once the nature of the failure has been established and the failure has been cleared, it may be determined that the mechanical switch 70 can be closed again.

The energy storage device is here thought to be connected on the right side of the third switch 8, and the left side of the third switch 8 is thought to be connected to the first switch 2*a* and thereby the first terminal 4*a*. In this way, a current flowing to the right charges the energy storing device, while a current flowing to the left discharges the energy storage device. The mechanical switch 70 is closed in normal operation, but can be opened if a failure occurs in the converter cell. When a failure occurs and the current flows to the left, the mechanical switch 70 is kept closed until the current changes direction and flows to the right into the energy storage device. When the current flows to the right, the first thyristor 9*a* is then triggered to conduct, whereby the mechanical switch 70 can be opened with low or even no risk for arcs. When a failure occurs and the direction flows to the right, the first thyristor 9*a* is triggered to conduct right away, whereby the mechanical switch 70 can be opened with low or even no risk for arcs. Once the mechanical switch 70 is open, the thyristor can be controlled to an open, circuit breaking state. The mechanical switch 70 can also be opened if there is no current flowing in it such as if the load current is flowing in the second switch or when second switch has failed into a short circuit and load current is flowing in the short circuit.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A converter arm comprising a plurality of converter cells, each converter cell comprising:
    a first terminal and a second terminal;
    an energy storage device connected on a first end to the second terminal;
    a first switch connected on a first end to the first terminal;
    a second switch arranged between the two terminals; and
    a third switch connected between a second end of the first switch and a second end of the energy storage device,
    wherein the converter cell is arranged to open the first switch and the third switch when the second switch has failed into an open circuit.

2. The converter arm according to claim 1, wherein the converter cell is arranged to open the third switch when the first switch has failed.

3. The converter arm according to claim 2, wherein the converter cell is arranged to open the third switch when the first switch has failed into an open circuit or a short circuit.

4. The converter arm according to claim 3, wherein the third switch comprises two antiparallel thyristors.

5. The converter arm according to claim 3, wherein the third switch comprises a bidirectional thyristor.

6. The converter arm according to claim 2, wherein the converter cell is arranged to open the third switch to prevent charging of the energy storage device.

7. The converter arm according to claim 6, wherein the third switch comprises two antiparallel thyristors.

8. The converter arm according to claim 2, wherein the third switch comprises two antiparallel thyristors.

9. The converter arm according to claim 2, wherein the third switch comprises a bidirectional thyristor.

10. The converter arm according to claim 1, wherein the third switch comprises two antiparallel thyristors.

11. The converter arm according to claim 10, wherein the converter cell is arranged to control energisation of the energy storage device by controlling a phase angle of one of the thyristors allowing a current to energise the energy storage device.

12. The converter arm according to claim 1, wherein the third switch comprises a bidirectional thyristor.

13. The converter arm according to claim 1, wherein the third switch comprises a thyristor in parallel with a mechanical switch.

14. The converter arm according to claim 1, wherein each of the first and second switches comprises a semiconductor device and an antiparallel diode.

15. The converter arm according to claim 14, wherein the semiconductor device is an insulated gate bipolar transistor, IGBT.

16. The converter arm according to claim 1, wherein the energy storage device is a capacitor.

17. A method for controlling a converter arm comprising a plurality of converter cells, each converter cell comprising a first terminal and a second terminal; an energy storage device connected on a first end to the second terminal; a first switch connected on a first end to the first terminal; a second switch arranged between the two terminals; and a third switch connected between a second end of the first switch and a second end of the energy storage device, the method comprising the step of:
    when the second switch has failed into an open circuit, opening the first switch the third switch.

18. The method for controlling the converter arm according to claim 17, further comprising the step of: when the first switch fails, opening the third switch.

19. The method for controlling the converter arm according to claim 18, further comprising the step of:
    controlling the third switch to limit power transfer to the energy storage device.

* * * * *